United States Patent [19]

Bowling

[11] 4,217,694
[45] Aug. 19, 1980

[54] APPARATUS AND METHOD FOR CHECKING SCORE LINES IN FLAT PACKAGE BLANKS

[75] Inventor: James A. Bowling, Midlothian, Va.

[73] Assignee: Philip Morris Incorporated, New York, N.Y.

[21] Appl. No.: 5,330

[22] Filed: Jan. 22, 1979

[51] Int. Cl.³ .............................................. G01B 5/02
[52] U.S. Cl. .............................. 33/125 A; 33/147 R; 33/174 R; 33/DIG. 1
[58] Field of Search ............. 33/125 A, 147 R, 147 E, 33/147 T, 174 R, DIG. 1

[56] References Cited

U.S. PATENT DOCUMENTS

| | | | |
|---|---|---|---|
| 3,213,543 | 10/1965 | Masuda | 33/147 T |
| 3,355,810 | 12/1967 | Franklin | 33/DIG. 1 |
| 3,981,081 | 9/1976 | Welch | 33/147 T |
| 4,106,204 | 8/1978 | Schäder | 33/147 T |

OTHER PUBLICATIONS

Burton, Walter, "Precision Measuring with a Microscope", *Popular Mechanics*, Nov., 1943, pp. 125–127.

*Primary Examiner*—Richard R. Stearns
*Attorney, Agent, or Firm*—Watson, Leavenworth, Kelton & Taggart

[57] ABSTRACT

The positioning of a score line on a flat package blank can be determined relative to a datum edge by positioning the datum edge at the zero mark of a measurement scale and moving a carriage having a magnification reading unit to a position over the score line, the distance appearing from the position of a carriage reference surface on the measurement scale as well as on a caliper unit mounted on the carriage for exhibiting the measurement of distance the reference surface has passed beyond a major increment of measure on the scale.

6 Claims, 6 Drawing Figures

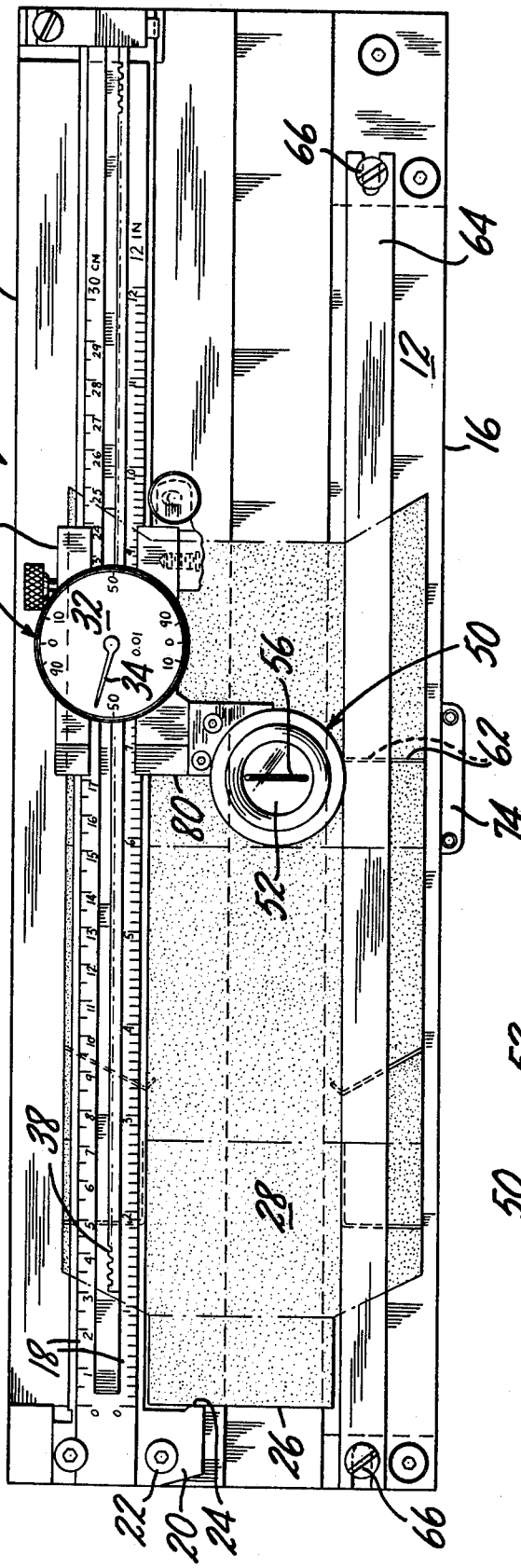
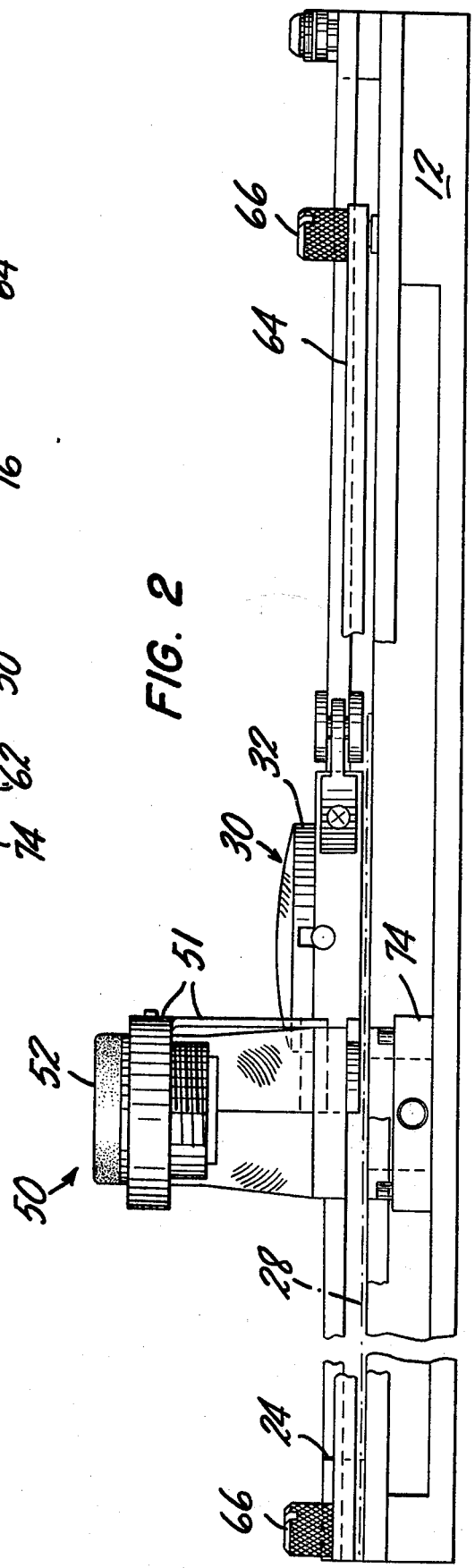
FIG. 1
FIG. 2

APPARATUS AND METHOD FOR CHECKING SCORE LINES IN FLAT PACKAGE BLANKS

BACKGROUND OF THE INVENTION

Various types of packages or containers are known in the art, which packages are erected from a package blank containing various scores or cut lines along which the panels of the blank are bent to form the package enclosure. Such blanks generally are manufactured on gang die units which effect the appropriate cutting and/or scoring. One of the drawbacks expected to be encountered is the occasional inaccuracy of the formation of the appropriate scoring and cutting surfaces on the dies. In consequence, the folds or score lines impressed in the package blanks may not be properly positioned relative to a datum edge of the blank so that when the blank is erected a properly shaped and dimensioned package results. It is desirable that such condition be avoided particularly in certain applications such as cigarette-manufacturing operations wherein many thousands of packages are manufactured on a production line every minute. If the blanks do not provide the optimized shape and size package, the filled package must be rejected. Accordingly, it is advantageous to provide for periodic checking of the blanks before they are fed into the cigarette-packaging machine to ascertain the accuracy of the placement of the cut and score lines therein.

Devices analogous to the type with which the present invention is concerned are described in U.S. Pat. Nos. 1,078,145; 1,680,805; 2,443,572; 2,516,569 and 3,222,786.

SUMMARY OF THE INVENTION

The present invention is directed to an apparatus for checking the location of a cut or score line in a flat package blank relative to a datum edge of the blank. It is described herein as being utilized in conjunction with the checking of flat package blanks which are used for making cigarette packages of the so-called "flip-top" type. However, it will be understood that it could be used for checking a wide range of blanks used for cartons of various description.

In accordance with the present invention, the apparatus includes a tray on which the blank to be checked can be received with the tray having at one end a stop means in the form of a raised abutment against which the datum edge of the blank can be engaged. Suitable means can be carried on the tray for clamping the package blank in secure position thereon. A measurement scale which can be provided both in graduations of inches and centimeters is disposed adjacent one longitudinal margin of the tray and the zero mark of the measurement scale is aligned in coincidence with the abutment. A dial caliper unit is mounted on the tray for sliding movement longitudinally thereof and of the measurement scale with the dial caliper unit including a carriage on which is carried a dial indicator including a pointer. Suitable drive means, e.g., a rack in mesh with a pinion on the indicator component of the dial caliper unit so that upon sliding of the carriage the pointer on the dial indicator is caused to rotate. As will be understood the measurement scale is divided into major increments of inches or centimeters and the dial indicator in turn is graduated to indicate subdivisions of each major increment of the measurement scale.

The carriage further has a reference surface or edge thereon which can be brought into abutment with the stop means on the tray and in such position of the carriage, the pointer on the dial indicator will be at zero position. Also disposed on the carriage is a magnification reading means in the form of a magnifying unit which embodies a hairline member that is aligned with the reference surface on the carriage. Thus the carriage can be slid to bring the hairline member in registry with a cut or score line on the package blank and thereby to determine the location. When the hairline member is thus positioned in registry with the cut or score line, the location of the carriage reference point relative to a particular major increment of length of the measurement scale as well as the position of the pointer on the dial indicator will denote the distance measure of the cut or score line from the datum edge of the blank. If such distance measure varies beyond the intended dimension, it will signify that the blank and hence the lot of blanks from which it was selected for checking should be rejected and thus not placed in the production operation.

A further feature of the invention involves the use of a carrier member slidable on the tray independently of the carriage and movable at the underside of the blank, the carrier member mounting a permanent magnet. By placing a ferrous wire material on top of the package blank and suitably slidably maneuvering the carrier member, the wire is caused to be attracted by the magnet and carried along the upper surface of the package blank until the same is received in the cut or score line to be checked. The carriage is then slid to position the magnification reading means over the wire. The employment of the wire of ferrous material further enhances the accuracy with which the central line of the cut or score line can be determined with observation through the magnification member, the hairline member of the magnification reading means being aligned with the center line of the wire.

The invention also is directed to a method for checking the location of a cut or score line on a package blank.

The invention, accordingly, comprises the features of construction, combination of elements and arrangement of parts, as well as manipulative procedures which will be exemplified in the construction hereinafter set forth and the scope of the invention be indicated in the claims.

BRIEF DESCRIPTION OF THE DRAWINGS

A fuller understanding of the nature and objects of the present invention will be had from the following detailed description taken in conjunction with the accompanying drawings showing by way of example, preferred embodiments of the inventive concept and in which:

FIG. 1 is a top plan view of an apparatus constructed in accordance with the principles of the present invention, the carriage being depicted in a position in which the hairline member of the magnification reading means is located a short distance to one side of the cut or score line to be checked.

FIG. 2 is a front elevational view of the apparatus shown in FIG. 1.

Throughout the following description, like reference numerals are used to denote like parts in the drawing.

DESCRIPTION OF THE PREFERRED EMBODIMENTS

Figure 3:
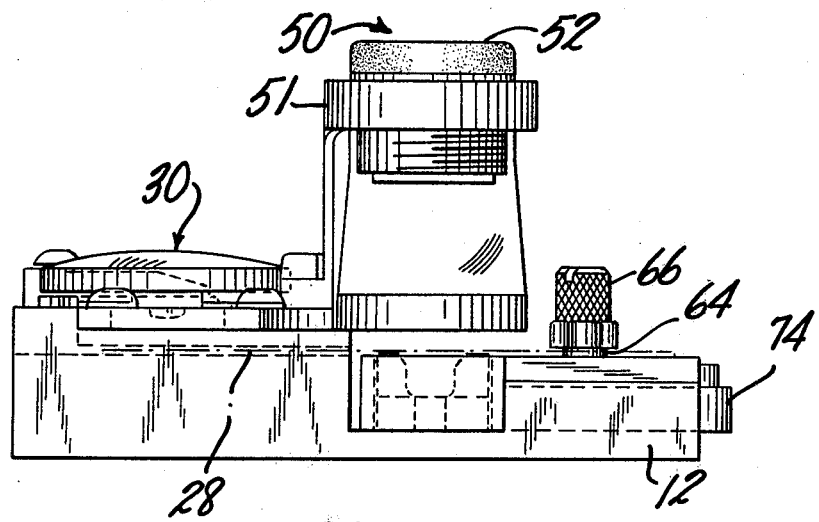
FIG. 3 is an end elevational view of the apparatus shown in FIGS. 1 and 2 as viewed from the left end thereof.

Referring now to FIGS. 1–3 of the drawings, there is depicted an apparatus 10 which includes an elongated tray member 12 having opposed longitudinal margins 14 and 16. The tray member 12 is provided with a measurement scale 18 adjacent its upper margin as viewed in FIG. 1, such measurement scale being provided conveniently both in measure of inches as well as the equivalent in centimeters. The major increments of measurement are denoted with numerals in the usual fashion with there being provided as well minor incremental graduations otherwise undesignated but it being understood and as can be seen being equivalent in the case of the inch scale to 1/10 of an inch. Disposed at one end (the left end in FIG. 1) on the tray there is a stop abutment structure defined by plate member 20 securely fastened to the tray as with set screws 22 and which presents a projecting abutment surface 24 against which can be received the datum edge 26 of a blank 28 to be checked. As will be noted, the zero mark of measurement scale 18 is coincident with the edge of abutment 24. Disposed on the tray and mounted on carriage 36 for sliding movement therealong, is a dial caliper unit 30 the carriage being secured over the measurement scale supporting member with suitable embracing or bracket like structure to ensure straight line travel of the caliper unit when same is slid. The caliper unit 30, it will be noted, includes a dial indicator 32 including a pointer 34 mounted in the dial indicator with the caliper unit being fixedly secured to the carriage. Furthermore, drive means in the form of a rack 38 is operatively connected or in constant mesh with a pinion fixed to the pointer of the caliper unit carriage 36 at the underside of the caliper unit, the same being effected in known manner. Such drive arrangement causes, when the carriage 36 is slid, rotation of the pointer 34 to provide accurate measure of the incremental distances of a particular score line beyond a major increment of distance from datum edge 24. Thus the dial of the depicted unit is graduated into two semi-circular scales measuring each 0.100 inches in correspondence to each of the ten undesignated incremental marks between each major designation on the inch scale 18. A complete revolution of pointer 34 denotes 0.200 inches of carriage travel.

The apparatus also includes a magnification reading means 50 fixed to carriage 36 as by standard and socket unit 51 in which is received a magnifying lens unit 52 provided with a hairline 56, the lens unit being rotatably adjustable to accommodate various users. The hairline 56 is aligned with datum edge 80 on the carriage.

Figure 4:
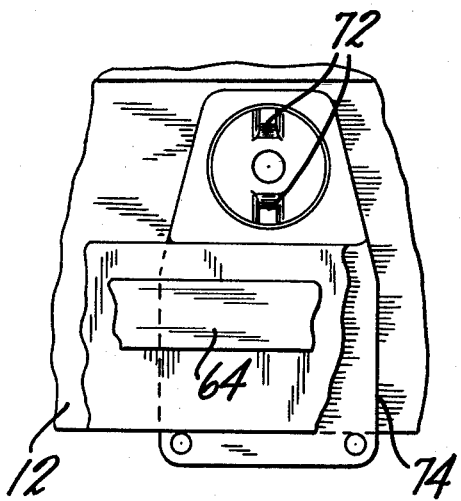
FIG. 4 is an enlarged fragmentary view depicting the carrier connected with the carriage and upon which is mounted the permanent magnet employed for moving a ferrous wire along the upper surface of package blank received in the tray of the apparatus.
Figure 5:
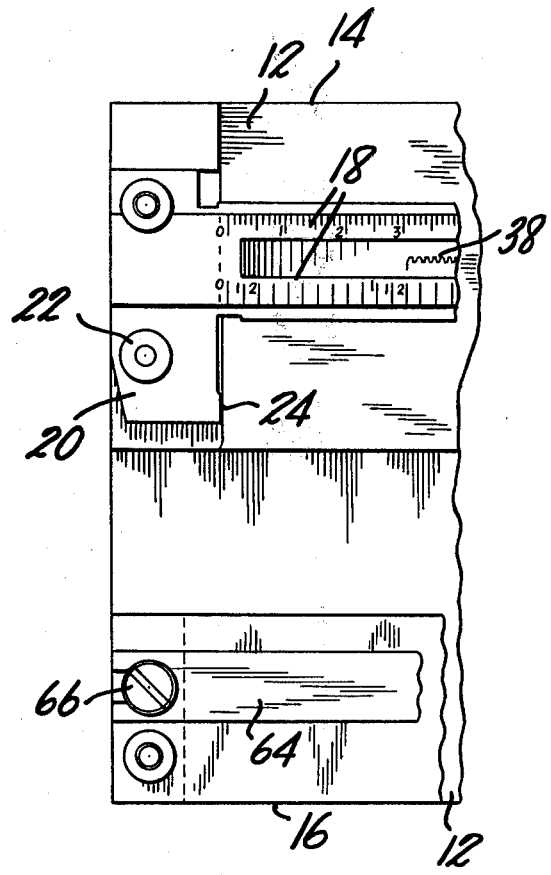
FIG. 5 is a fragmentary plan view of the left end of the tray showing with greater clarity the structure of the stop abutment and the measurement scale forming part of the tray structure.

The apparatus also includes a slidably mounted carrier member 74 disposed at the underside of the blank 28 and slidable in like fashion to the carriage 36 but independently of the movement of same. The carrier member 74 as seen in FIG. 4, mounts a pair of permanent magnets 72. By disposing a ferrous wire 70 on top of the carton blank 28 and sliding the carrier member, the wire can be attracted by the influence of the permanent magnet and thus carried along the face of the package blank as the carrier member is being slid until the wire is deposited in and retained by the cut or score line 62 in the blank to be checked. Thus by aligning the hairline 56 of the magnification means in registry with the wire, the positioning of the carrier 36 in optimized location to provide precise measurement data concerning the location of the cut or score line is assured.

Figure 6:
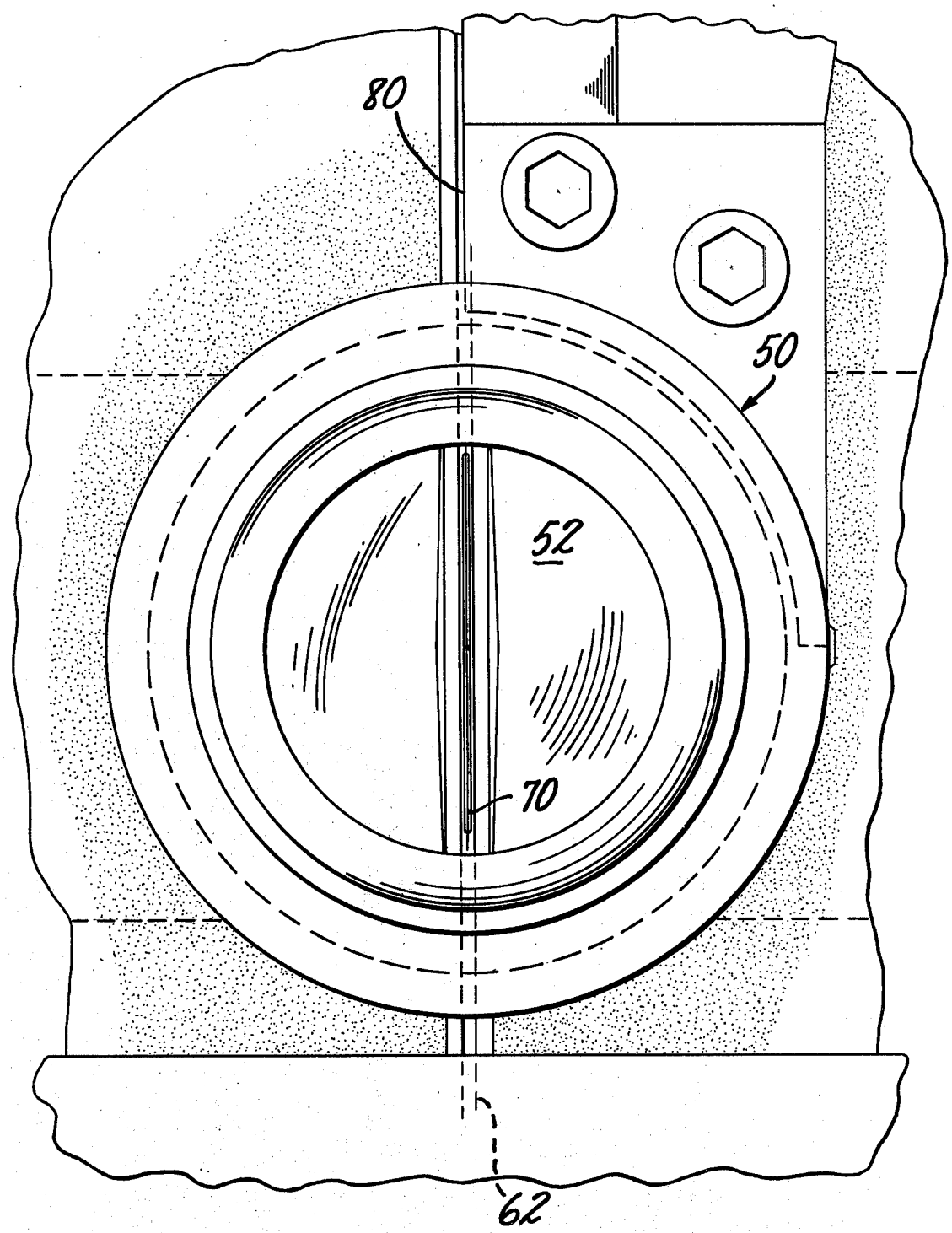
FIG. 6 is a fragmentary plan view on a greatly enlarged scale depicting the presence of the ferrous wire member in the cut or score line on the package blank as viewed through the hairline member of the magnification reading means, the hairline member registering above the ferrous wire.

In FIG. 1, the magnification reading means and the ferrous wire are depicted in a position just prior to the arrival of the reference edge 80 at the left side of the carriage and consequently the hairline of the magnification unit which is in alignment therewith over and in registry with the score line 62 which is being checked. Such registry positioning is as mentioned depicted in FIG. 6.

In making the actual measurement, and assuming that the score line 62 is the one under consideration for checking purposes, it will be seen that the reference edge 80 of the carriage is beyond the six inch mark on the measuring scale, denoting a distance of 6 inches of from blank datum edge 26. Added to this would be the 8 increments between 6 and 7 inches (where score line 62 lines up) denoting 0.800 inches and finally pointer 34 would be at the right side of indicator 32 at about almost ¼ revolution of the pointer indicating approximately 0.035 inches indicating in total that score line 62 is 6.835 inches from the datum edge 26. If such measurement is within the tolerances allowable for commercial utilization of the blank, the same will, as to the positioning of the particular score line, be acceptable for the manufacturing process. If, however, the measurement should represent the deviation beyond acceptable tolerances for what such measurements should be, it will signify that the blank is one from a lot that should be rejected. Similar measurement of the other score lines also are taken.

For receiving the blank 28 on the tray, a locking bar 64 and set screws 66 can be provided.

While there is disclosed above certain embodiments of the method and apparatus of the present invention, it is still possible to produce other embodiments without departing from the scope of the inventive concept herein disclosed, and accordingly, it should be understood that all matter contained in the above description, and in the accompanying drawings should be interpreted as illustrative and not in limiting sense.

What is claimed is:

1. Apparatus for checking the location of a cut or score line in a flat package blank relative to a datum edge of said blank, said apparatus comprising
   a tray for holding the blank to be checked;
   stop means carried on said tray and constituting an abutment against which the datum edge of said blank can be engaged;
   a measurement scale carried on said tray and extending longitudinally along the tray from said stop means, the zero mark of said scale being coincident with said abutment;

a dial caliper unit mounted on said tray for slidable movement along said measurement scale, said dial caliper unit including a carriage, a dial indicator including a pointer mounted on said carriage, drive means on said carriage operatively connected to said dial indicator and rotatively engaged with said measurement scale for rotating the pointer of said dial indicator when said carriage is slid along said measurement scale, said carriage having a reference surface which can be brought into engagement with said abutment by sliding said carriage against said stop means, the pointer on said dial indicator being positioned at a zero reading when said reference surface is engaging said abutment, the measurement scale being graduated in major increments of length, the dial indicator being graduated to denote subdivision of one major increment for each complete revolution of said pointer; and magnification reading means mounted on said carriage and embodying a hairline member aligned with the reference surface on said carriage, said carriage being slid to position said hairline member in registry with a cut or score line on said package blank, the location of said carriage reference point relative to a major increment of length on said measurement scale and the position of the pointer on said dial indicator denoting the distance measure of said cut or score line from the datum edge of said blank said apparatus further including a carrier member fixed to said carriage and movable therewith at the underside of said package blank, a permanent magnet fixed to said carrier member, and a wire of ferrous material receivable on top of said package blank, said magnet attracting said wire to move it along said blank and position it in said cut or score line.

2. The apparatus of claim 1 further comprising means carried on said tray for clamping said package blank to said tray.

3. The apparatus of claim 1 in which the measurement scale is graduated in major increments of inches.

4. The apparatus of claim 1 in which the measurement scale is graduated in major increments of centimeters.

5. The apparatus of claim 1 in which the measurement scale is graduated in major increments of inches and centimeters.

6. A method for checking the location of a cut or score line in a flat package blank relative to a datum edge of said blank, said method comprising positioning the datum edge of said blank against an abutment on a tray having a measurement scale extending longitudinally of said abutment with the zero mark of said scale being coincident with said abutment, disposing a ferrous material wire on top of said blank and moving a carrier member carrying a permanent magnet at the underside of said blank to attract said wire and position it in the cut or score line, and then determining the distance measure of said cut or score line from the abutment from said scale.

* * * * *